UNITED STATES PATENT OFFICE.

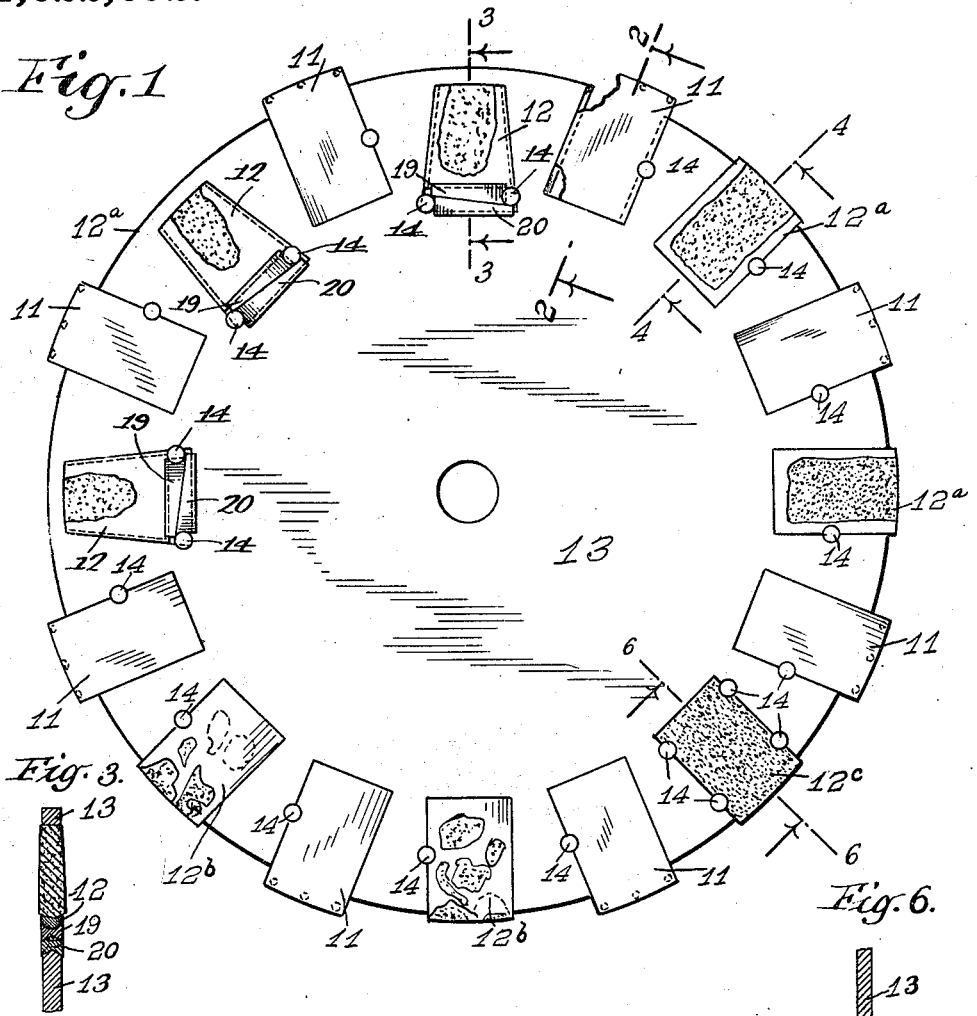

WILLARD F. MEYERS, OF LONG ISLAND CITY, NEW YORK.

STONE-SAW.

1,022,692.

Specification of Letters Patent.

Patented Apr. 9, 1912.

Application filed March 31, 1909. Serial No. 486,857.

*To all whom it may concern:*

Be it known that I, WILLARD F. MEYERS, a citizen of the United States, residing at Long Island City, borough of Queens, city of New York, in the county of Queens and State of New York, have invented certain new and useful Improvements in Stone-Saws, of which the following is a specification, reference being had therein to the accompanying drawings, forming part thereof.

My invention relates generally to stone saws, and particularly to saws for cutting marble, granite, and any stone which requires careful dressing.

Broadly, the objects of my invention are durability, reliability and efficiency of operation, and economy in time and labor. Certain objects of my invention, however, are capable of being stated with more particularity. For example, in sawing or severing stone of the character mentioned above, what is known in the art as diamond saws, that is, saws having diamonds set in the cutting edge, are generally used because of their great efficiency and durability. However, these and similar cutting teeth leave the cut surfaces rough, shattered and full of minute cracks, and to smooth off these surfaces a second operation is necessary in which an abrasive is employed such as emery, "carborundum", or other suitable substance. By this operation the shattered or cracked portion of the material is removed by the abrasive and a firm smooth surface obtained. Or an abrasive wheel alone is sometimes employed which performs both operations at once and leaves the cut surfaces smooth, but this method is so slow that it is not practicable.

One object, therefore, of my invention is to provide a saw which shall perform both operations at once with the same rapidity with which the sawing alone is done in the first method mentioned above, and by which, when the stone is cut, the cut surfaces shall be dressed at the same time. My invention includes means for doing this by combining rapidly cutting teeth and abrasive teeth in the same saw in such a way that the two sets of teeth shall be coöperative and effect both operations at once.

Many other advantages and objects of my invention will appear from the following description.

I shall now describe my invention with reference to the accompanying drawings and shall thereafter point out my invention in claims.

Figure 1 is a side elevation of a saw embodying my invention. Fig. 2 is an enlarged sectional detail through a diamond tooth on a plane indicated by line of section 2—2 of Fig. 1. Fig. 3 is a sectional detail through an abrasive tooth on a plane indicated by line of section 3—3 of Fig. 1. Fig. 4 is a sectional detail through a modified form of abrasive tooth on a plane indicated by line of section 4—4 of Fig. 1. Fig. 5 is a plan view of what is shown in Fig. 4 and as viewed from the cutting edge of the saw in Fig. 1. Fig. 6 is a sectional detail through a further modified form of abrasive tooth on a plane indicated by line of section 6—6. Fig. 7 is a plan view of what is shown in Fig. 6 as viewed from the bottom and as viewed from the cutting edge of the saw. Fig. 8 is a transverse longitudinal section through a further modified form of abrasive tooth. Fig. 9 is a detail of a piece of work illustrating the operation of my saw.

In the illustrated embodiment of my invention I employ diamond teeth as the cutting teeth, it being understood that any suitable cutting material may be used; and the abrasive material of the abrasive teeth may be emery, corundum, "carborundum", pieces of grindstone, or other suitable natural or artificial gritty abrasive material. A plurality of different constructions or modifications of the abrasive teeth are shown in the drawings, but all operating in substantially the same manner, and teeth of different kinds may be set in the same saw blade, as shown. The saw is shown as a circular rotary saw, although my invention is equally applicable to reciprocating saws.

Referring now to the drawings, the diamond teeth 11 and the abrasive teeth 12, $12^a$, $12^b$ and $12^c$, are arranged alternately on the saw blade 13. The diamond teeth 11 and the abrasive teeth 12, $12^a$ and $12^b$ are set in sockets about the cutting edge of the saw blade 13, and fit in these sockets in any suitable way, and the diamond teeth 11 and the abrasive teeth $12^a$ and $12^b$ are shown as secured therein by rivets 14. The diamond teeth 11 are of the usual construction in which diamonds are cast or otherwise set into the corners of metal blocks which serve as holders. The abrasive teeth 12, $12^a$ and $12^b$ are formed by placing pieces or blocks of abrasive material in a mold with molten metal, and the metal cools and forms a holder for the abrasive material, each tooth 12 and 12ª having only one such block or piece, which is exposed at the outer end and at both sides of the tooth, while each tooth 12ᵇ has a plurality of pieces or fragments cast therein. The abrasive teeth 12ᶜ comprise slabs or blocks of abrasive material forming teeth without a holder, such slabs being secured to opposite sides of the saw blade 13 by the rivets 14 as shown. The abrasive teeth 12ª, 12ᵇ and 12ᶜ, as shown in the drawings, extend out a slight distance beyond the periphery or edge of the saw blade 13 and the cutting teeth 11 are longer than these abrasive teeth and extend out from the saw blade still farther.

It is unnecessary that the abrasive teeth should extend out to the edge or periphery of the saw blade 13 and this is exemplified in the abrasive teeth 12 which are set, respectively, in apertures through the saw blade 13 back from the edge thereof. This is the preferred construction and is a superior construction because of the fact that the strip of metal extending between each tooth receiving aperture and the edge of the saw blade 13 strengthens the saw blade.

For the sake of clearing the material ground or cut out by the operation of the saw, the cutting teeth 11 at their outer ends are thicker than the saw blade 13, while at their inner ends they taper down thinner as shown in Fig. 2. The abrasive teeth 12, 12ª and 12ᵇ are still thicker than the cutting teeth and are of a uniform thickness one with another, excepting that the teeth 12 are tapered in thickness toward their outer ends (Figs. 2 and 3). In practice, I prefer to make this difference in thickness between the cutting teeth and the abrasive teeth about one-thirty-second of an inch, although this may be varied as is desired. The abrasive teeth 12ᶜ project from the sides of the saw blade 13 to the same extent as do the other abrasive teeth 12, 12ª, and 12ᵇ.

The cutting teeth 11 are adapted for rapid cutting, but, since the diamonds are hard set stones, they leave the surfaces rough, shattered, disintegrated and minutely cracked, and leave raveled and imperfect arres or edges. The abrasive teeth 12, 12ª, 12ᵇ and 12ᶜ, however, being of softer and abrasive material and extending at the sides beyond the cutting teeth, follow up and take off a thin portion of material and leave the surfaces dressed and the arres perfect, smoothing both surfaces at once. This is illustrated in Fig. 9, in which a piece of work 15 is shown as cut partly through. The lower portion 16 of this cut shows the rough and disintegrated surfaces through which the cutting teeth have passed, but which have not yet been reached by the abrasive teeth; and the upper portion 17 of the cut shows the smoothly dressed surfaces left by the abrasive teeth. It is evident that by this method the stone is divided or separated and dressed in one operation and in the same time that the severing operation alone has been performed heretofore.

In Fig. 8 is shown an abrasive tooth 18 and illustrates the shape assumed by the abrasive teeth 12ª and 12ᵇ, from usage, and it is evident that they may be made originally in this shape if desired. In the case of the abrasive teeth 12ª and 12ᵇ, the outer edges at first perform most of the work and are soon worn off to the tapered shape illustrated in Fig. 8. In this shape the teeth are even more effective, since the whole beveled faces act as grinding or dressing surfaces. If the teeth are not made in this shape, they quickly assume it, as the edges soon wear off and the taper, at first short, gradually grows longer and the effectiveness of the tooth grows as it wears. It is obvious that corresponding results take place in the case of the teeth 12ᶜ. The preferred construction of abrasive teeth 12 is shown as of this more effective tapered form (see Figs. 2 and 3).

It should be noted that the diamond teeth sever or divide the piece of work first before the abrasive teeth reach the point in the work which has been acted upon by the diamond teeth. Because of the kerf made by the cutting teeth or severing teeth, the abrasive teeth come in contact with the work only at their sides, hence these teeth do not wear away at all at the middle, but on their sides only, as indicated in Fig. 8.

The abrasive teeth 12 may be retained in their apertures in any convenient way. As shown in the drawings, the aperture for any tooth 12 is wedge-shaped and tapered toward the edge of the blade 13, and the tooth 12 is of a corresponding wedge-shape but of less length than the aperture. A V-shaped joint is formed between the side edges of the tooth 12 and the saw blade 13, as indicated by the dotted lines and similar to that most clearly shown in Fig. 5 in reference to the teeth 12ˣ. The tooth 12 may be forced toward the narrower end of the aperture and firmly locked in position therein by oppositely arranged wedges 19 and 20 having a tongue-and-groove engagement with each other and respectively with the base of the tooth 12 and the inner end wall of the aperture. The wedges 19 and 20 are kept tight by the rivets 14 pressing against the larger ends of the wedges 19 and 20, respectively. These rivets 14 may be of identical construction with the rivets 14 which hold in place the cutting teeth 11 and the other abrasive teeth 12ª, 12ᵇ and 12ᶜ.

It is obvious that the arrangement of the cutting and abrasive means may be variously changed and that various other modifications may be made in the construction shown and above particularly described within the principle and scope of my invention.

I claim:

1. A stone saw comprising a blade, rigid abrasive teeth thicker than the blade extending from one side of the blade to the other and projecting from the opposite sides of the blade to form abrasive surfaces, and cutting teeth thinner than the abrasive teeth and projecting beyond the abrasive teeth at the edge of the blade.

2. A stone saw comprising a blade, rigid abrasive teeth thicker than the blade extending from one side of the blade to the other and projecting from the opposite sides of the blade to form abrasive surfaces, and cutting teeth thicker than the blade and thinner than the abrasive teeth and projecting beyond the abrasive teeth at the edge of the blade.

3. A stone saw comprising a blade, rigid abrasive teeth thicker than the blade extending from one side of the blade to the other and projecting from the opposite sides of the blade, and cutting teeth thicker than the blade and thinner than the abrasive teeth and projecting beyond the abrasive teeth at the edge of the blade, the abrasive teeth being tapered in thickness toward their outer ends.

4. A stone saw comprising a blade, a set of teeth carried by the blade for severing the stone, and another set of abrasive teeth carried by the blade for dressing the sides of the cut made by the first set of teeth, each abrasive tooth having active abrasive surfaces projecting from the opposite sides of the blade, the teeth in one set being arranged on the blade in alternate relation with the teeth of the other set.

5. In a stone saw, the combination of a blade having a socket in the edge thereof and an aperture back from such edge, a cutting tooth secured in the socket, and an abrasive tooth secured in the aperture and projecting therefrom at the sides of the blade to there form abrasive surfaces.

6. A stone saw comprising a blade, cutting teeth projecting from the edge of the blade for severing the stone, and rigid abrasive teeth containing gritty abrasive material and projecting from the sides of the blade to there form abrasive surfaces for dressing the sides of the cut made by the cutting teeth, the cutting teeth projecting beyond the abrasive teeth at the edge of the blade and the abrasive teeth projecting beyond the cutting teeth at the sides of the blade.

In testimony whereof I have affixed my signature in presence of two witnesses.

WILLARD F. MEYERS.

Witnesses:
VICTOR D. BORST,
WM. ASHLEY KELLY.